United States Patent [19]

Chicklis

[11] 4,110,702
[45] Aug. 29, 1978

[54] DEEP RED LASER

[75] Inventor: Evan P. Chicklis, Nashua, N.H.

[73] Assignee: Sanders Associates, Inc., Nashua, N.H.

[21] Appl. No.: 744,671

[22] Filed: Nov. 24, 1976

[51] Int. Cl.² .............................................. H01S 3/16
[52] U.S. Cl. .......................... 331/94.5 F; 331/94.5 Q
[58] Field of Search ...................... 331/94.5 E, 94.5 F, 331/94.5 Q; 330/4.3

[56] References Cited

U.S. PATENT DOCUMENTS 3,972,007  7/1976  Naiman et al. ................... 331/94.5 F

OTHER PUBLICATIONS

Caird et al., Analysis of Laser Emission in $Ho^{3+}$-Doped Materials, IEEE J. Quant. Elect., vol. QE-11, No. 3 (Mar. 1975), pp. 97–99.

Chicklis et al., High-Efficiency Room-Temperature 2.06-mm Laser Using Sensitized $Ho^{3+}$:YLF. Appl. Phys. Let., vol. 19, No. 4 (Aug. 15, 1971), pp. 119–121.

*Primary Examiner*—William L. Sikes
*Attorney, Agent, or Firm*—Louis Etlinger; Richard I. Seligman

[57] ABSTRACT

A room temperature, optically pumped, solid state laser operating at 0.75 micrometers including a $Ho^{3+}$:LiYF$_4$ crystal provides an excellent source for optical target location systems and other applications which require a source of high peak power in the spectral region just beyond the visible – the "Deep Red".

5 Claims, 3 Drawing Figures

DEEP RED LASER

BACKGROUND OF THE INVENTION

This invention relates to lasers, and, more particularly, to lasers which emit in the deep red spectral region.

Many military systems would benefit from the development of sources of radiation which are "in band" to the receivers. For example, active optical target location systems require laser sources in the visible to near infrared region of the electromagnetic spectrum. This results from the fact that the return from an optical system (its cross section) is highest in its intended region of usage. Thus, for detection of visual or television optical systems sources in the spectral region from 0.4 to 0.9 micrometers are required.

Currently there are very few solid state laser sources under development which have the performance potential for these applications. Doubled Nd lasers which emit at 0.53 micrometers are inadequate for many applications because the radiation is visible to the naked eye. Er:LiYF$_4$ which emits at 0.85 micrometers is unsatisfactory for certain applications because the wavelength is too far into the infrared. Ruby lasers which emit at 0.69 micrometers are basically three-level lasers with a high threshold which allows operation only at very low repetition rates.

SUMMARY OF THE INVENTION

Accordingly, it is an object of this invention to provide a high peak power, high repetition rate, high efficiency optically pumped laser source in the "Deep Red" region of the spectrum.

It is another object of this invention to provide such a source which can operate at room temperature with high peak power and high efficiency at 0.75 micrometers.

It is a further object of this invention to provide a high repetition rate solid state laser which operates between 0.53 and 0.85 micrometers.

Briefly, an optically pumped solid state laser operating at 0.75 micrometers is provided by using an holmium (Ho$^{3+}$) doped lithium yttrium fluoride (LiYF$_4$) crystal.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENT

There exist many electronic transitions which might result in laser operation in the spectral region of interest. For high peak power, high efficiency operation at room temperature in an optically pumped solid state laser, spectroscopy of the candidate system must meet certain requirements. These requirements exist both for the candidate electronic transition in some ion and for the host into which the ion is doped.

Transition Properties

Figure 1:
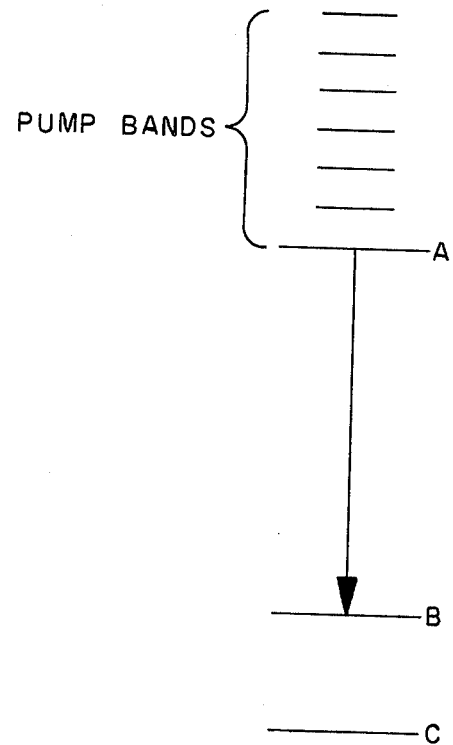
FIG. 1 is a diagram of the energy level structure of an idealized ion.

The chosen transition will in general consist of an upper laser level (A in FIG. 1), a lower laser level (B), the ground level (C) and the pump bands. The general conditions imposed on the transition for high efficiency are:

1. an energy separation between B and A corresponding to the frequency of the desired laser transition specifically a frequency separation of between approximately 13000 to 14000 cm$^{-1}$.
2. A wide energy separation between levels B and C compared to KT (K=Boltzmann's constant, T=temperature) to assure 4 level operation.
3. A series of closely spaced levels above A to provide a rapid decay rate between the pump band levels and upper laser level (A).

The level structure of Holmium, specifically the $^5S_2 - ^5I_7$ transition in Holmium, fulfills these requirements. However, a suitable crystalline host for this transition must be found in which the Ho spectroscopy exhibits certain additional properties. These are enumerated below:

Host Properties

In order to complement the specific properties described above a crystalline host must be chosen in which the host/holmium ion combination exibits the following properties:

1. a narrow spectral linewidth of the A-B fluorescence transition (high gain),
2. a long fluorescence lifetime for the A level,
3. host transparency throughout the region of the Ho pumpbands (0.5 - 0.2 μm).
4. high resistance to damage induced by pump radiation in the pump band region,
5. good thermal and mechanical properties and the ability to grow the crystal with arbitrary amounts of Holmium.

Ho:LiYF$_4$ is a ion/host combination which uniquely satisfies all the above requirements.

Figure 2:
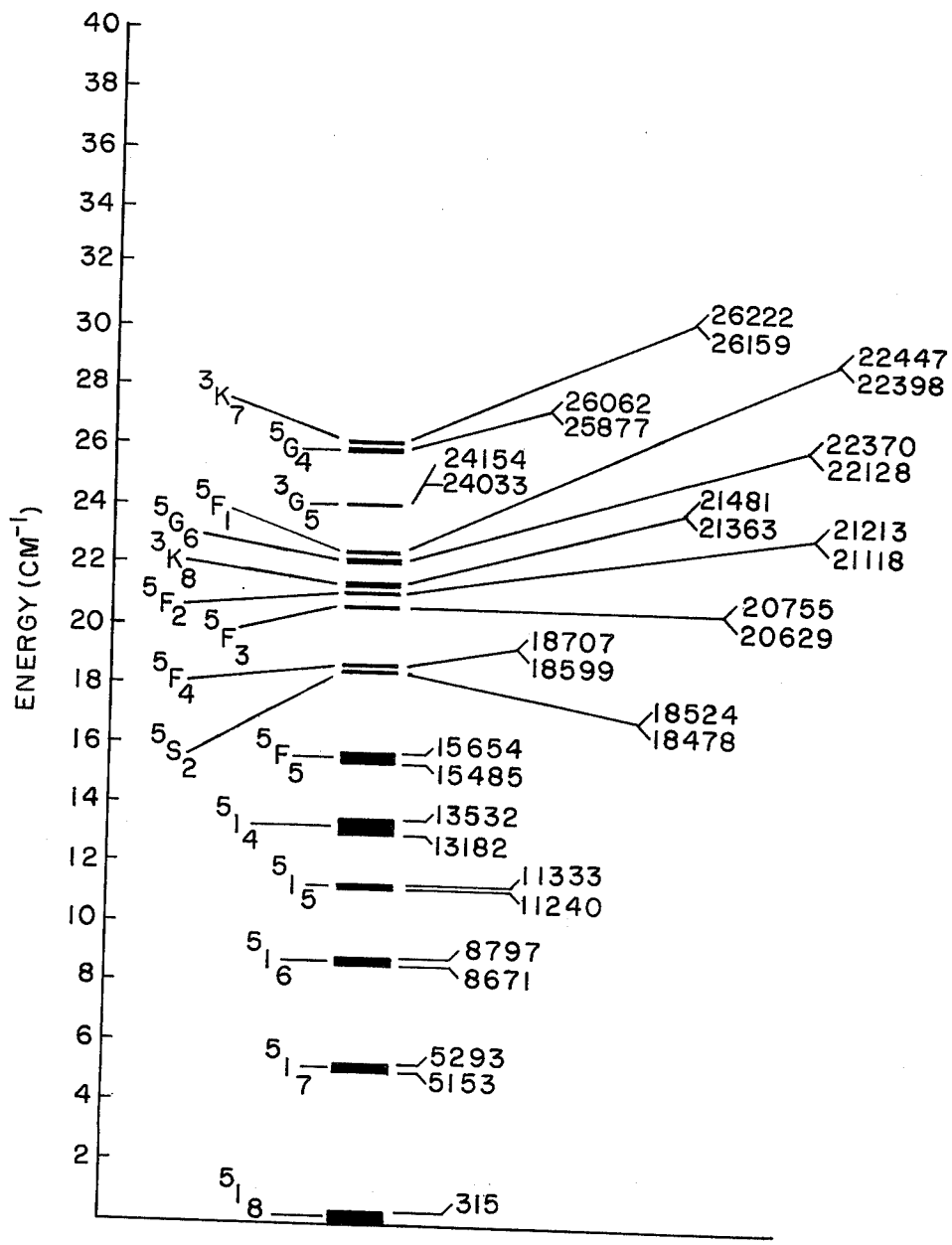
FIG. 2 is a diagram of the energy level structure of Ho$^{3+}$:LiYF$_4$.

The energy level structure of Ho:LiYF$_4$ is shown in FIG. 2.

Figure 3:
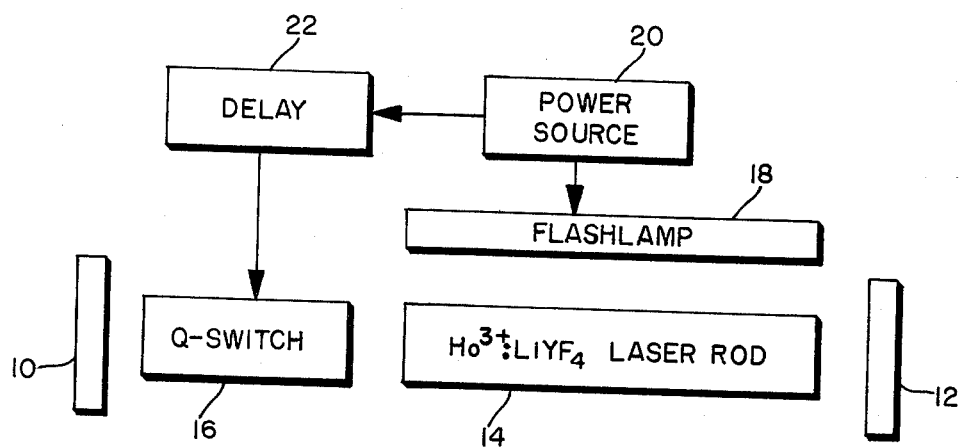
FIG. 3 is a block diagram of a 0.75 micrometer laser.

Referring now to FIG. 3 of the drawings there is illustrated thereby a preferred embodiment of the invention. The laser of FIG. 3 comprises a laser cavity defined by a resonating means comprising a pair of highly reflective mirrors 10 and 12. Although mirrors are illustrated as the resonating means crossed Porro prisms could be substituted therefor in order to eliminate misalignment problems as is well known in the art. In this event means would be provided to output the laser from the center of the cavity. Alternatively, only one Porro prism could be used and the output taken at the remaining mirror.

Positioned within the cavity and along its optical axis is a laser medium 14 and a Q-switch 16. Preferably, the laser medium is a Ho$^{3+}$:LiYF$_4$ rod.

Next to the laser rod 14 there is mounted a pumping means 18 for exciting the rod 14 into a state of high population inversion, typically, a flashlamp. Flashlamp 18 is electrically excited by a voltage from a power source 20.

Q-switch 16 is employed to contain the laser energy within the cavity until a sufficient population inversion is achieved within the rod 14. Typically, a Pockel cell is utilized to effect such Q-switching.

Q-switch 14 is switched under the control of a time delay means 22 which is initiated by a signal from power source 20. However, the means for providing energy to the flashlamp 18 and the particular means for controlling Q-switch 16 form no part of the invention as they are well known and many different circuits may be used.

In operation the pumping means 18 receives a pulse of current from the power source 20 and emits a pulse of pumping radiation of the appropriate wavelength to excite the molecules in the lasing device 14. The Q-switch 16 is actuated through delay 22 so as to put the optical cavity in a low Q or high loss condition. After a period of time has elapsed to permit the excited atoms in rod 14 to reach a state of high population inversion the voltage applied to Q-switch 16 is removed thus establishing in the optical cavity a low loss or high Q condition. Almost simultaneously with this switching, a laser pulse is emitted from the cavity.

While the illustrated embodiment sets forth particular components of the laser other functionally equivalent components could be substituted therefore. Thus, it is to be understood that the embodiment shown is illustrative only, and that many variations and modifications may be made without departing from the principles of the invention herein disclosed and defined by the appended claims.

I claim:

1. An optically pumped solid state laser, comprising: a laser cavity;
a laser medium which lases at 0.75 micrometers disposed in said cavity; and
means for supplying pump energy to said laser medium to cause 0.75 micrometers radiation to be emitted from said cavity.

2. A laser as defined in claim 1, further including a Q-switch disposed in said laser cavity.

3. A laser as defined in claim 1, wherein said laser medium is a holmium doped lithium yttrium fluoride crystal.

4. The laser as defined in claim 3, wherein said pump energy supplying means includes a source of intense radiation in the region of the holmium pump bands.

5. The laser as defined in claim 4, wherein said pump energy supplying means includes a flashlamp.

* * * * *